United States Patent [19]

Bieringer et al.

[11] 4,091,796
[45] May 30, 1978

[54] SOLAR ENERGY COLLECTION APPARATUS

[75] Inventors: Robert J. Bieringer; George R. Mather, Jr., both of Toledo, Ohio

[73] Assignee: Owens-Illinois, Inc., Toledo, Ohio

[21] Appl. No.: 714,724

[22] Filed: Aug. 16, 1976

[51] Int. Cl.² .............................................. F24J 3/02
[52] U.S. Cl. ....................................... 126/270; 126/271
[58] Field of Search ............. 126/270, 271; 237/1 A; 240/103 R, 103 A, 103 B, 103 C, 104, 105; 52/526, 594; 350/293, 294, 299, 310

[56] References Cited

U.S. PATENT DOCUMENTS

| 448,733 | 3/1891 | Sagendorph | 52/526 |
|---|---|---|---|
| 3,134,906 | 5/1964 | Henker | 126/270 |
| 3,952,724 | 4/1976 | Pei | 237/1 A X |
| 3,954,097 | 5/1976 | Wilson, Jr. | 237/1 A |
| 4,002,160 | 1/1977 | Mather, Jr. | 126/271 |

FOREIGN PATENT DOCUMENTS

| 319,045 | 3/1957 | Switzerland | 240/103 B |
|---|---|---|---|
| 400,982 | 11/1933 | United Kingdom | 240/103 B |

*Primary Examiner*—Kenneth W. Sprague
*Assistant Examiner*—Larry Jones
*Attorney, Agent, or Firm*—John R. Nelson; Myron E. Click; David H. Wilson

[57] ABSTRACT

An evacuated, double wall, tubular solar energy collector having a concave, specular reflecting surface corresponding to a segment of a cylinder positioned at the opposite side of the collector tube from the sun. The reflector is detachably connected to the tube and the tube is engaged by raised spacing points on the reflector to provide the proper spaced relation between them and allow for water drainage along the reflector. Plural units of the collector tube and cylindrically-shaped reflector combination are supported along opposite sides of an elongated manifold for circulation of an energy absorbing media through them. This system improves the efficiency of total energy collection without tracking the sun or focusing the reflected radiation. The tubes are no more than three diameters apart and the cylindrical reflector has its focal line within the absorbing area of the collector tube. The radius of curvature of the reflector surface exceeds the radius of the tube and is defined as a function of the tube diameter and tube spacing.

16 Claims, 8 Drawing Figures

SOLAR ENERGY COLLECTION APPARATUS

SOLAR ENERGY COLLECTION APPARATUS

The present invention relates to solar energy collectors. More specifically, the invention provides an improved, efficient tubular, evacuated collector system for providing solar energy as heat in a media for heating, cooling or other purposes.

BACKGROUND OF THE INVENTION

In the copending application of co-inventor George R. Mather, Jr., Ser. No. 549,291, filed Feb. 12, 1975 (now U.S. Pat. No. 4,002,160), there is disclosed an array of similar multiple glass solar energy collector tubes connected in a manifold and supported parallel to each other between the sun and a diffuse planar reflecting surface. The tubes are parallel to the reflecting surface and spaced a distance no more than four times the tube outside diameters of the collector tubes from the planar diffuse reflector and spaced apart center-to-center of the tubes a distance no more than four times such outside diameter dimension. Approximately half the sunlight falling between the collector tubes and reaching the diffuse reflecting surface is reflected to the tube undersides. Comparing this array to an array of close packed tubes, the spaced array contains half as much hardware (tubes, etc.) but delivers about the same amount of energy under most operating conditions. Inasmuch as the diffuse reflecting surface of planar design is significantly less expensive than the collector tubes eliminated in the spacing recommended, a highly cost-effective collector system is achieved.

However, this diffuse reflector array has solar intercept efficiencies in the range of 50–60%, depending upon the time of solar day, because approximately half the light incident to the reflecting surface is not reflected to the lower surface of the parallel collector tubes. If this light is collected, the resultant intercept efficiency would approach 80%. Additionally, an increase in tube spacing of the array would lead to even lower effective loss coefficients and therefore to further improvements in performance at higher temperatures.

SUMMARY OF THE INVENTION

In the present invention, a non-imaging, cylindrically-contoured, specular reflector is used to collect light otherwise lost in the prior diffuse reflector system. Reflector design includes two important considerations: (a) the contoured reflector must collect diffuse as well as beam light efficiently, and (b) the reflector must not require tracking of the sun during the solar day.

It is therefore an important object of the invention to provide individual non-imaging optical specular reflectors contoured with respect to the tubes and supported at their underside (away from the sun) of the tube in a precise spacing.

This contoured concave reflector is substantially a cylindrical segment and extends along the length of the absorbing surface in the collector tube. This cylindrical segment reflector has a focal line which does not in general coincide with the tube axis.

A further object of the invention is to provide a cost effectiveness of the specular reflector, just described, which will be justified in view of the gain in efficiency of the system.

Another object of the invention is to provide a solar tubular collector system in which extra total light is received on the collectors with an improvement in effective loss coefficient, the combination of tube spacing and reflectors of the invention enhance the overall efficiency of operation of the evacuated tubular collectors in total collection of solar energy without sun tracking. While good performance can be achieved with the diffuse planar reflector of the earlier-mentioned application Ser. No. 549,291 (U.S. Pat. No. 4,002,160), significant improvements result in the present invention by use of non-imaging specular contoured reflectors.

Best performance is obtained in the preferred form of the invention in limiting the relationship of tube spacings on their centers d to the outer diameter of the cover tube of the collector D in the range of a ratio of d/D of slightly more than 1.0 to 3.0 depending upon operating temperature.

Costs tend to decrease fairly rapidly of the hardware in the system with increased tube spacing dimensions d in the array since greater spacings result in less tube hardware per effective square foot of collection area. Judging collector cost effectiveness on the basis of cost per unit of energy produced, the most effective design in the use of the invention is at spacings of d/D of about 1.4 to 2.3. Comparison of the planar, diffuse reflector and the specular cylinder segment reflector on cost does result in energy efficiency increase with the present invention. Overall impact on collector cost effectiveness results in a trade-off of extra cost in the apparatus directly against the enhanced energy output of the collector. At the wider spacings, the extra cost of the reflectors can be counter balanced by a combination of benefits in the enhanced output of energy and lower collector hardware cost per unit of area. In addition, the non-imaging character of the reflector favors non-critical optics of the system such that minor imperfections in the reflector contour can be tolerated with no appreciable sacrifice of performance.

As used herein, the term "non-imaging" is intended to mean properties of a reflector surface which does not depend upon optical focusing.

The critical design parameters of the apparatus in the invention are determined under the following:
Where:
$d$ is center-to-center spacing between adjacent tubular collectors,
D is the outer diameter of the cover tube of the collector, and
R is the radius of the cylindrically-segmented, contoured reflector.

$$R = 2\sqrt{1 - (\frac{D}{d})^2}$$

The geometric center line or axis of the cylindrically-segmented reflector is generally located along a line extending vertically above the center axis of the collector tube by the distance RD/d. Coincidentally, at d/D of 2, the focal line of the reflector coincides with the center axis of the collector. From these design equations the reflector desired for each tube spacing arrangement $d$ and cover tube size D may be determined. It is preferred to place the reflector about the lower part of the tube in a pseudo nesting relationship, the reflector being suspended in its support from the tube. The reflector is provided with raised, projected (convex) support points along the reflector surface to space the cover tube and concave reflecting surface a desired distance apart. The cover tube surface of the collector is thereby also spaced from the concave surface of the reflector to allow for drainage in an installation and prevent ice and dirt from accumulating between the two surfaces.

In practice there is an optimum spacing between the reflector and the cover tube surfaces for each center-to-center spacing d and cover tube diameter D.

DETAILED DESCRIPTION OF THE INVENTION

Figure 1:
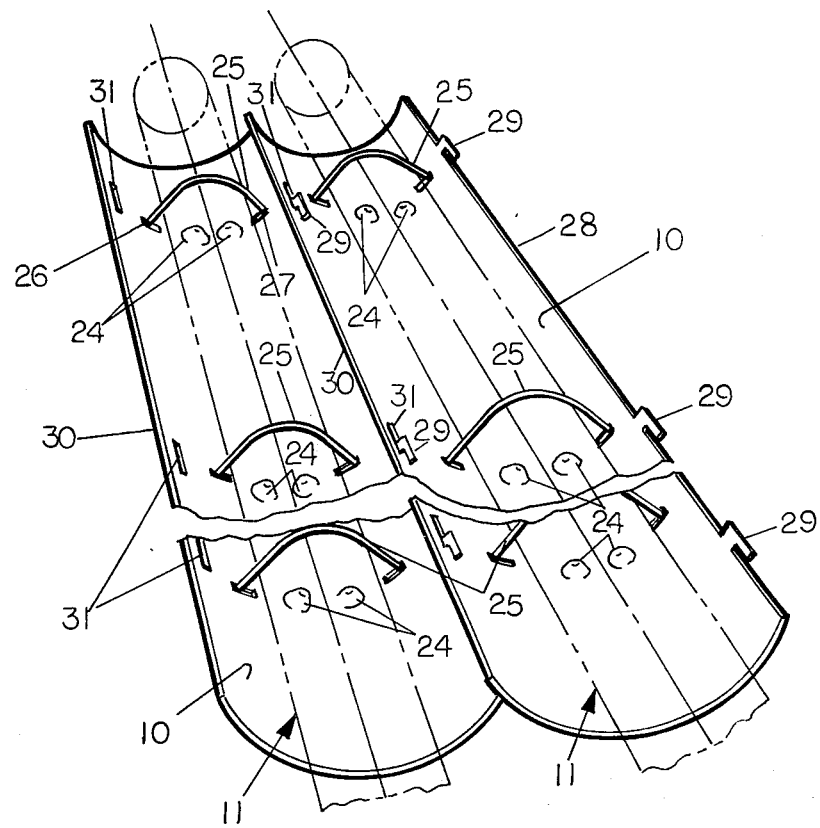
FIG. 1 is a perspective view of the reflectors of the invention assembled on adjacent collector tubes shown in phantom outline.

FIG. 1 illustrates a pair of generally cylindrically-shaped, sheet metal reflectors 10 assembled side by side in edgewise connected relationship about the lower side of two adjacent glass collector tubes 11 (shown in phantom outline) as they are a part of the evacuated tubular solar collector apparatus, such as is disclosed in U.S. Pat. No. 3,952,724 and in Ser. No. 634,714, filed Nov. 11, 1975 (now U.S. Pat. No. 4,033,327), which is common in ownership with this application. The reflectors 10 are shaped of a relatively rigid material, such as a sheet metal. The preferred example is a reflector 10 formed of sheet aluminum that is anodized on the concave surface with high reflectance aluminum to provide a specular (mirror) finish. The reflector may be made of plastic or organic material, fiberglass or the like and anodized, plated or evaporated with a specular, reflecting coating having a specular reflectance of about 0.85 or higher. The specular surface may be formed by other means; however, the important aspect in such a selection is in the cost effectiveness and from the standpoint of cost and durability, the aluminum sheet and anodized aluminum reflecting surface thereon is the preferred embodiment. The reflector 10 is shaped in its concavity to define a segment of a cylinder having a radius of curvature R (FIG. 5) generated from a line that is along the point Y. In its angular displacement, the cylindrical reflecting surface is an arc segment, in section, that is less than a semi-circle.

Figure 2:
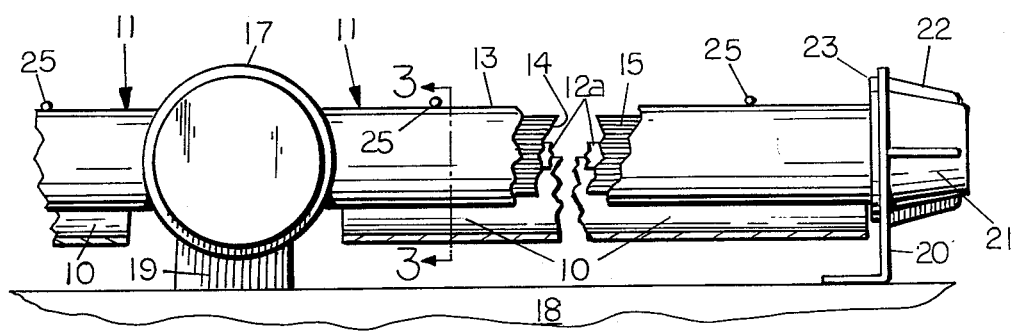
FIG. 2 is a side elevation, partly broken away, of a collector module incorporating the present invention.
Figure 3:
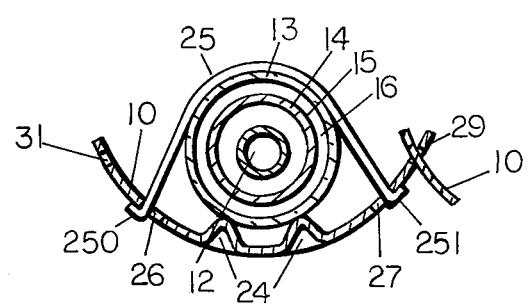
FIG. 3 is an end sectional view of one of the collector tubes taken along line 3—3 on FIG. 1.

Referring to FIGS. 2 and 3, the cylindrical reflector 10 is disposed (slung) on the undersurface of the glass collector tube apparatus, indicated generally at 11, which comprises a transparent glass cover tube 13 and a glass absorber tube 14 of less O.D. than the I.D. of tube 13. The outer surface of the absorber tube 14 is coated with a wave length selective coating 15 to absorb solar energy striking that surface. The interior chamber 12 of the absorber tube 14 provides access for an energy absorbing media which may be circulated by a means 12a for exchange of the energy to the media and circulating the energy laden media in the system for utilizing the collected solar energy. The annular space 16 between the inner surface of cover tube 13 and the coated outer surface of tube 14 is evacuated, preferably to a hard vacuum on the order of $10^{-4}$ torr. The vacuum in annular space 16 reduces and virtually eliminates conduction and convection losses from the collector. The collector tube 11 is constructed such that the cover tube 13 and absorber tube 14 each have a closed end and an open end. The open ends of the tubes 13 and 14 are matched and the wall of one of these tubes is hermetically sealed by a glass-to-glass fusion seal with the wall of the other, thus closing the annular space 16. The vacuum is pumped through a tubulation at the other closed end of the cover tube and tipped off and fused closed in conventional fashion. The open end of the double-walled tube assembly provides access to the interior of the absorber tube 14. This open end is inserted into a receiving port or receptacle along the side of a manifold 17, such manifold being disclosed in detail in Ser. No. 634,714 (U.S. Pat. No. 4,033,327), but shown only in end view on FIG. 2. The module of the collector apparatus includes multiple collector tubes 11 connected at opposite sides of the manifold and equally spaced apart along its length. Manifold 17 is mounted on a supporting surface 18, such as a sloped roof or the like, which parallels the plane of the collectors selected to provide an advantageous solar exposure of the tubes to solar radiation. The system is non tracking. Manifold 17 includes plural support standards 19 spaced along its length providing for a spacing of the apparatus from surface 18 to allow for drainage of rain and snow or the like. The outer closed ends of tubes 11 protrude through an apertured bracket 20 and an end support cap 21 is held against the end of each tube 11 and fastened onto bracket 20 by a bayonet fastening means 23. The end support cap 21 includes axial ribs 22 which together with means 23 retain it in the aperture of the bracket.

The reflector 10 is supported along the underside of the cover tube 13, best shown on FIG. 3, in horizontal position and spaced by the upwardly protruding spacing points 24 formed in spaced array along the reflector (see FIG. 1). Points 24 are made in pairs, at least in 2 locations along the reflector for stability reasons; however, a single spacing point at two locations will provide suitable spacing for drainage. These raised points 24 on the reflector allow for drainage along the reflector underneath the cover tube, thus ice and snow or water will not accumulate. It is preferable the reflector be mounted on the support structure 18 through placement on the bracket-standard arrangement such that the reflector surface has a pitch for drainage. The reflector 10 is held on its collector tube 11 by thin, hanger straps or wires 25 which extend from underneath and through an aperture 26 in the reflector, then over the cover tube 13 and into a like aperture 27 in the reflector at the opposite side of the tube. This hanger 25 is preferably a resilient wire element individual to each reflector-tube set (FIG. 3), however, a continuous wire through a series of these reflector tube sets may be employed.

Using the individual spring-wire hangers 25, shown on FIG. 3, the reversed ends 250 and 251 snap against the underside of reflector 10 and retain their position collectively supporting the reflector 10 in slung fashion in a snug fit against the cover tube 13.

Figure 4:
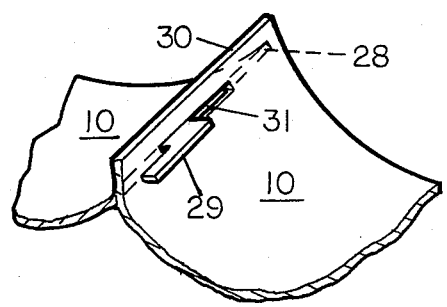
FIG. 4 is an enlarged perspective view of a portion of adjacent reflectors and cooperating integral fasteners for connecting them edgewise to each other.

The reflectors 10 mounted on adjacent tubes are fastened together in edgewise fashion by interlocking means best shown on FIGS. 1 and 4. Along one side edge 28 of reflector 10 are plural outwardly extending L-shaped tabs 29 shaped integral with the reflector. Along the opposite side and inwardly spaced from edge 30 are corresponding slots 31 through which the tabs 29 may be inserted in unison and when the reflector is shifted axially of the tube and along the elongated slots 31 the tabs engage the other adjacent reflector interconnecting the two. The solar energy collecting apparatus is thus assembled with the inclusion of the reflector improvement of the invention.

Figure 5:
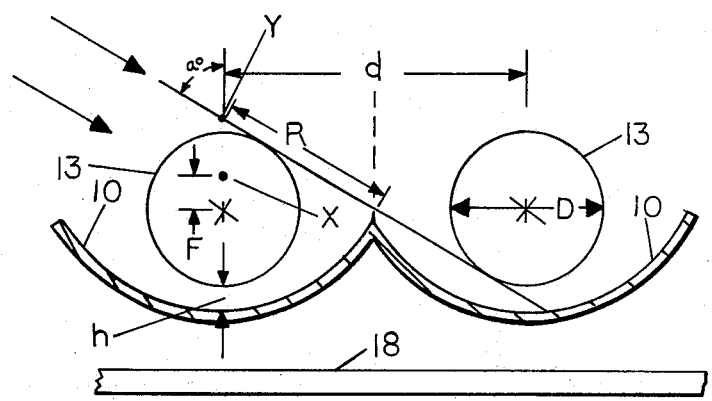
FIG. 5 is a schematic end elevational view of the invention illustrating its operational principles.

FIG. 5 illustrates in a schematic fashion the basic principles upon which the present invention operates. As is known, solar radiation is made up of two primary components. The one component is incident upon the surface of the earth from the position of the sun at any given time and place. This component is a collimated beam of light indicated by the angled line at angle "a" measured from vertical. The second component of total solar energy available is a diffuse-radiation component. This component is not collimated but is available from all angles at a surface, such as cover tube 13. The collimated beam component swings through angle "a" from 90°-0° and 0°-90° in a corresponding angle at the other side of vertical. This represents a "solar day". During the solar day, the sun's rays fall upon the intercept area of the tube and to either side of it. The collimated beams of light out of the tube intercept area impinge upon the specular surface of reflector 10. Since the reflector surface is generated as an arc segment of a hollow cylinder described about a longitudinal axis (point Y), the reflector has an optical focal line at point X with the concave cylindrical plane. As is well known in optics, this focal line X occurs at a point spaced from the central axis that is one-half the radius of curvature (R/2) of the cylindrical reflector surface.

The present invention employs non-imaging properties of the reflector in conjunction with the tubular collector and need not track the position of the sun. The focal line of the reflector should fall within the area encircled by the absorber tube of the collector. Collimated beams directed outside the tube intercept area strike the reflector, and all reflected incident light strikes the collector absorber surface upon reflection. The specular surfaces contemplated have a coefficient of reflection on the order of 0.8 and higher. Diffuse light is similarly either intercepted or reflected and intercepted by the tubular collector. To obtain improved efficiency of the collector and reflector of the invention, there are relationships which interrelate the spacing of the tubes from each other with the diameter of the outer tube utilized, and the radius of curvature of the reflector and the relationship in spacing between the focal line of the reflector and the center axis of the tube collector. It is to this principle the present invention is mainly directed.

The critical spacing features and properties of the reflector/collector tube arrangement will now be described, principally with reference to FIG. 5. It is known to mount a tubular solar collector element with its axis on the focal line of a shaped reflector, such as a focusing or "imaging" parabolic reflector. This requires that the reflector/collector array track the position of the sun to ensure maximum efficiency of solar radiation collection. The present invention utilizes a non-imaging reflector/collector combination. As such, the non-imaging reflector has the focal line (X) of the cylindrically-shaped reflector at a distance of R/2 from the center of curvature Y, R representing the radius of the cylindrical reflector surface. Since the focal line of this reflector does not in general coincide with the absorber tube center line (see FIG. 5), the reflector is basically non-imaging with respect to the absorber tube. The arrangement also provides for efficient collection of diffuse solar radiation.

The design criteria for the present invention are the following: The axis center-to-center spacing between adjacent tubular collectors is represented as dimension d on FIG. 5. The cover tube diameter is represented as D. The reflector axis or geometric center is positioned vertically above the tube axis by the distance equal to RD/d.

The reflector radius, R, is determined by:

$$R = \frac{d}{2\sqrt{1 - (\frac{D}{d})^2}}$$

Figure 6:
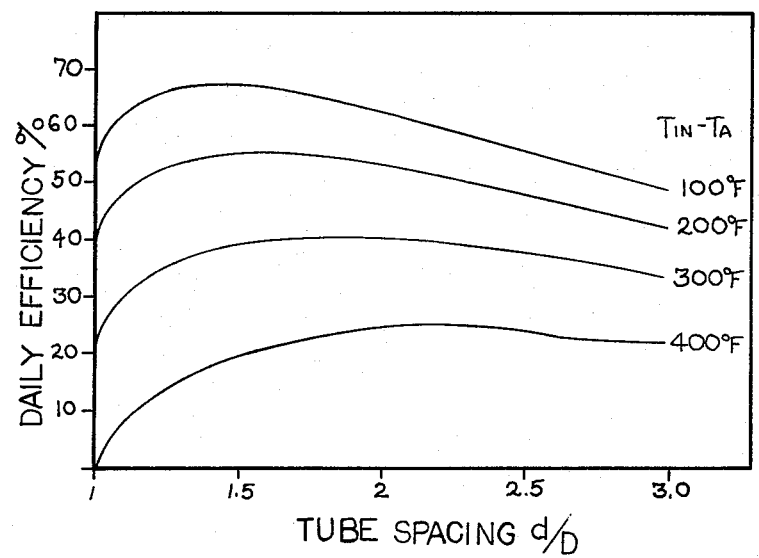
FIG. 6 is a chart of operating efficiency of the invention at different operating temperatures over a range of tube spacings and size ratios d/D.

For large values for d, the gap between the reflector and tube 14 (dimension h on FIG. 5) becomes too large to be of practical interest. Reflector design is of practical interest over a range of smaller spacings d. The chart of FIG. 6 illustrates collector performance over the range of interest, i.e. d/D values from slightly greater than 1 to 3. For each operating condition wherein a temperature difference $T_{in}-T_a$ exists, there is an optimum spacing between the reflector and tube and between adjacent tubes. $T_{in}$ is the temperature of the heat exchange media as it enters the collector, and $T_a$ is the ambient outside temperature. FIG. 6 plots the ratios of d/D versus the percent efficiency of collection and produces isothermal curves for $T_{in}-T_a$ in 100° steps from 100° to 400° F. The peak efficiencies are obtained overall in the temperatures given utilizing d/D relationships of from 1.4 to 2.3.

Figure 7:
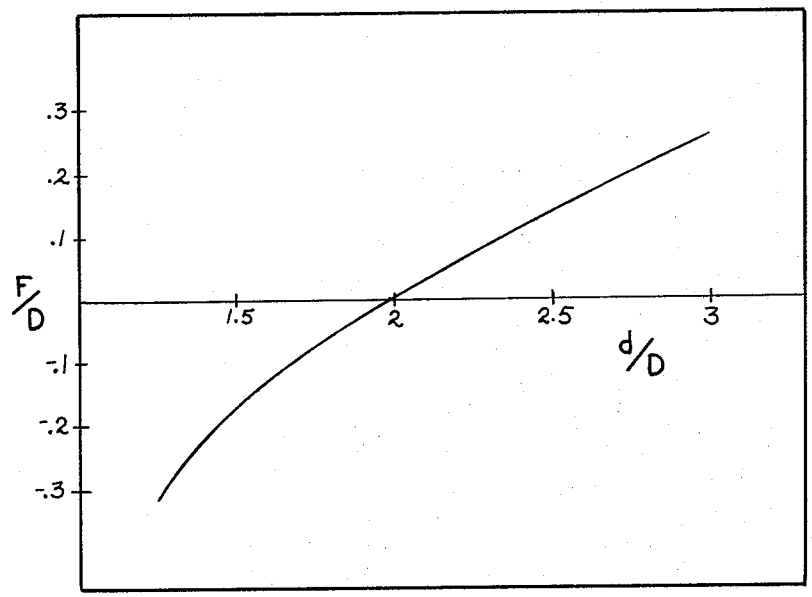
FIG. 7 is a chart of the d/D tube spacing/size relationships versus the distance F between tube axis and focal line of the reflector divided by tube diameter D.

The chart on FIG. 7 illustrates the non-imaging function of the reflector in relation to the collector for d/D values of slightly greater than 1.0 to 3.0 in accordance with the design criteria outlined for the invention. On the graph, the plus or minus distance F on FIG. 5 between the center axis of cover tube 13 and the focal line (point X) as a function of tube diameter (D) is plotted against the d/D ratio for values 1.0 – 3.0. The focal line X should reside within the cross-sectional area of the absorber tube circumference. Value for F is variable in its transition along the vertical line connecting through the geometric centers of the tubular collector and reflector from about −0.3 at d/D of 1.25 through zero at d/D of 2.0 to a +0.26 at d/D of 3. This curve defines the positioning of the concave reflector 10 and collector 11 relative to each other in achieving the improved efficiencies of energy collection.

EXAMPLE

Figure 8:
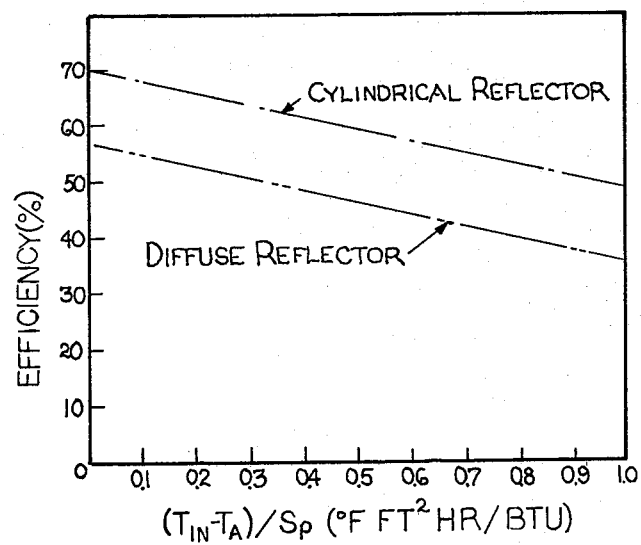
FIG. 8 is a chart of the efficiencies of the energy collection versus the solar energy radiated in the plane of the collectors, the curves comparing performance of the present invention and the diffuse reflector system of the aforementioned earlier copending application, Ser. No. 549,291 (U.S. Pat. No. 4,002,160).

FIG. 8 is a chart showing the performance data of a tubular collector and the cylindrically segmented reflector designed in accordance with the parameters of FIGS. 6 and 7 and outlined earlier herein compared with the planar diffuse reflector and tubular collector combination described in the aforementioned Ser. No. 549,291 (U.S. Pat. No. 4,002,160). In the tests performed from which each set of the data was obtained, a plurality of tubular collectors, described herein, were connected with a manifold which supplied and circulated water through the interior chamber 12 of the absorber tubes in series. The tests were made in the spring season at latitude 41.6° N (Toledo, Ohio) at solar noon and the collectors were mounted in a tilt plane of 45° facing south. Ambient temperature averaged 55° F ($T_a$) and inlet water temperature varied from 70°–220° F ($T_{in}$). The data plotted for the curve "Diffuse Reflector" was obtained using a plain white, flat diffuse reflector spaced at the back side (away from the sun) of the collectors in accordance with the parameters of the disclosure in said Ser. No. 549,291 (U.S. Pat. No. 4,002,160). The curve was drawn to represent the best overall fit of the date plotted. The cylindrical reflectors made in accordance with the present invention, as described above, and having average specular reflectance of approximately 0.85 over their concave surfaces were mounted on the cover tubes of the same set-up of the collectors and manifold as in the diffuse reflector test. The value of d/D used in the test was approximately 2.0, the tube spacing d being identical in each test. The spacing F conformed to FIG. 7. The plot of the data resulted in the curve labelled "Cylindrical Reflector" again drawn to represent the best overall fit to the data. Total insolation, as Sp (sun energy output in the plane of collection), was measured at approximately a thirty minute interval spanning solar noon and $T_{in}$ temperatures were recorded by thermocouple in the collectors. The data from each test were recorded after about one-half hour after flow of water was begun in the manifold. [An element of water requires about one-half hour to move from collector inlet to outlet in the apparatus.] Outlet temperatures were measured one-half hour after inlet temperatures and the insolations were averaged over the residence time of the water in the collector. The result in the two curves demonstrates the increase in efficiency of total energy collection utilizing the principles of the invention.

The "cylindrical reflector" curve and the "diffuse collector" curve each have the same slope, since the spacing between tubes in each test, and therefore the effective loss coefficients, are the same.

The practical range of the spacing in the invention is in the range of d/D 1.25 to 3.0 with the preferred spacing at d/D ratio of 1.4 to 2.3.

What is claimed is:

1. The combination of
    an elongated, tubular solar energy collector,
    a shaped reflector of a relatively rigid material having a concave reflecting surface comprised of a specular reflecting layer thereon, said concave surface having a constant radius of curvature defining a segment of a cylinder smaller than a semi-cylinder,
    plural, spaced, thin, resilient elements connected to the reflector at laterally spaced points thereon and encircling the collector suspending the reflector at the underside of the collector for support thereby, and
    spacing means disposed between the tubular collector and the reflecting surface engaging the collector at plural longitudinally spaced points on its outer surface for maintaining the collector at a predetermined spacing from the concave plane of the reflecting surface.

2. The combination of claim 1, wherein the spacing means comprises a plurality of raised spacing points integral with the reflector and projecting above the said plane of the reflecting surface a predetermined distance engaging the exterior surface of the tubular collector.

3. The combination of claim 2 wherein the reflector comprises a metal sheet having an anodized aluminum surface over the reflecting surface thereof characterized by an average specular reflectance of at least 0.80, the said plural spacing points thereon comprising raised portions of the metal sheet protruding a predetermined distance above the concave plane of said reflecting surface.

4. The combination of claim 1, wherein said resilient elements encircling the collector each comprise a one piece, spring-like hanger having an intermediate curved portion and reversedly curved end portions, the end portions being engaged in laterally spaced apertures of the reflector.

5. A solar energy collector apparatus comprising
    an elongated manifold,
    plural elongated tubular solar energy collectors connected to said manifold disposed in parallel, substantially equally spaced relationship and depending laterally along one longitudinal side of said manifold,
    individual elongated concave reflector elements for said collectors, the reflector elements being pre-shaped from sheet of relatively rigid material and having a light reflecting surface over the concave area of the reflector,
    means along the longitudinal edges of adjacent reflectors engaging the latter and interconnecting the adjacent reflectors to each other,
    spacing means interposed between the reflector surface and the exterior surface of the collector for maintaining the two surfaces in spaced relationship, and
    fastening means for suspending a reflector about each collector at the side thereof away from the sun and in spaced relationship therewith maintained by engagement of the collector along its exterior surface and said spacing means.

6. The apparatus of claim 5, in which said spacing means comprises a plurality of integral, raised points in the sheet of said reflector spaced longitudinally thereof.

7. The apparatus of claim 5 in which the sheet reflector is provided with one or more spaced apart pairs of apertures disposed between the said opposite longitudinal edges of the reflector, and the fastening means comprises an elongated one piece thin member held by the reflector and extending through each of the apertures of said pair of the reflector and encircling the tubular collector.

8. A solar energy collector apparatus comprising
    an elongated manifold,
    plural elongated tubular solar energy collectors connected to said manifold disposed in parallel, substantially equally spaced relationship and depending laterally along one longitudinal side of said manifold,
    individual elongated concave reflector elements for said collectors, the reflector elements being pre-shaped from sheet of relatively rigid material and having a light reflecting surface over the concave area of the reflector, means along the longitudinal edges of adjacent reflectors engaging the latter and interconnecting the adjacent reflectors to each other, said means comprising at least one elongated aperture along one longitudinal edge portion of each of the reflectors, and a substantially L-shaped tab corresponding with each said aperture projecting laterally from the opposite longitudinal edge thereof, said tab of one reflector being received in the corresponding aperture of the adjacent reflector and engaging the latter interconnecting said suspended reflectors, spacing means interposed between the reflector surface and the exterior surface of the collector maintaining the two surfaces in spaced relationship, and fastening means for suspending a reflector about each collector and in spaced relationship therewith maintained by said spacing means.

9. The apparatus of claim 8, in which said reflector is comprised of aluminum sheet and includes an anodized specular reflecting layer over the concave light reflecting surface thereof, there being a plurality of said elongated apertures along said one edge portion of the reflector and a plurality of said tabs along the opposite edge thereof, said tabs being integral with said sheet of the reflector and corresponding with the lateral position of said adjacent apertures.

10. A solar energy collector apparatus comprised of a plurality of spaced, parallel tubular collector elements having the same outside diameter and including a hollow circumferentially transparent cover tube having a closed end and an open end, and, interiorly of said cover tube, a hollow elongated absorber member of lesser outer diameter than the inner diameter of the cover tube providing an annular space therebetween, said member having a closed end and an open end adapted to receive an energy absorbing media therein, and including a solar energy absorbing surface disposed between its said ends, a seal closing the space between said absorber member and cover tube adjacent the open end thereof to thus provide a closed space therebetween, said space being evacuated, the tubular collector elements being spaced apart on their longitudinal centers more than one and not more than three times the outside diameter of said tubular elements, an elongated shaped reflector individual to each said collector element having a concave specular reflecting surface defining a segment of a cylinder surface and positioned on the side of said elements away from the sun and being substantially coextensive with the energy absorbing surface of said absorber member, said reflector surface having a focal axis falling within the cross-sectional area of the absorber member and spaced from the longitudinal center of the tubular collector element in a non-imaging relationship, the radius of curvature of said reflecting surface being defined by:

$$R = 2\sqrt{1 - (\frac{D}{d})^2}$$

wherein, $d$ is the longitudinal center-to-center spacing of the tubular elements, $D$ is the outside diameter of the tubular element, and $R$ is said radius of curvature, and means for circulating an energy absorbing media in heat exchange relationship with the absorber member of each of said tubular elements to exchange solar energy absorbed on said element.

11. The solar energy collector apparatus of claim 1 in which the longitudinal center of the tubular element is positioned in relation to the focal axis of its said individual non-imaging reflector a distance ranging from 0.3 of the outside diameter of said tubular element from the focal axis on the side away from the sun to 0.26 of the outside diameter of said element on the side nearest the sun.

12. The solar energy collector apparatus of claim 10, said tubular collector elements each being comprised of a cover tube and absorber member of cylindrical glass walls that are coaxially disposed with respect to each other, and said seal closing the opening between the absorber member and the cover tube adjacent the open end thereof comprises a fused glass seal between said cylindrical walls.

13. The solar energy collector apparatus of claim 1, wherein said means for circulating an energy absorbing media in heat exchange relation with said tubular elements comprises a manifold carrying said media to and from the tubular elements, a media circulation tube communicating with said manifold and extending interiorly of the hollow elongated absorber member to a location adjacent the closed end thereof.

14. The solar energy collector apparatus of claim 10, wherein the manifold is elongated and disposed intermediate said collector apparatus, the plurality of tubular collector elements being connected to the manifold such that more than one of said elements depend on opposite sides of the manifold, said individual reflectors common to one such side of the manifold being connected to each other along and adjacent a longitudinal edge of the adjacent reflectors.

15. The solar energy collector apparatus of claim 14, wherein the adjacent individual reflectors common to one such side of the manifold are connected to each other by means of one or more laterally depending integral tabs adjacent the longitudinal edge of one of the reflectors extending through a slot disposed in the proximity of the nearest longitudinal edge of the adjacent reflector and said tabs having a normal extending terminal ends engaging said adjacent reflector adjacent the said slot.

16. A solar energy collector apparatus comprised of a plurality of spaced, parallel tubular collector elements having the same outside diameter and including a hollow circumferentially transparent cover tube having a closed end and an open end, and, interiorly of said cover tube, a hollow elongated absorber member of lesser outer diameter than the inner diameter of the cover tube thereby providing an annular space therebetween, said member having a closed end and an open end, and including a solar energy absorbing surface disposed between its said ends, a glass-to-glass seal closing the space between said absorber member and cover tube adjacent the open end thereof to thus provide a closed space therebetween, said space being evacuated, the tubular collector elements being spaced apart on their centers more than one and not more than three times the outside diameter of said tubular elements, an elongated shaped reflector surface individual to each said collector element having a curved concave specular reflecting surface and positioned on the side of said elements away from the sun and being substantially coextensive with the energy absorbing surface of said absorber member, said reflector surface having a focal line spaced therefrom, the radius of curvature of said reflecting surface being defined by:

$$R = 2\sqrt{1 - (\tfrac{D}{d})^2}\; d$$

wherein, $d$ is the center-to-center spacing of the tubular elements, D is the outside diameter of the tubular element, and R is said radius of curvature, and means mounting the individual reflector along the side of the collector element away from the sun and spaced in a non-imaging relationship with the collector element, the focal line of the reflector falling within the cross-sectional area of the absorber member, said mounting being further characterized by the longitudinal center of the tubular element being spaced from the focal center line of the reflector by a distance that resides in the range corresponding to 0.3D in the vertical direction and away from the sun to 0.26D in the vertical direction and nearest the sun.

* * * * *